US007823077B2

(12) United States Patent
Kurtz et al.

(10) Patent No.: US 7,823,077 B2
(45) Date of Patent: Oct. 26, 2010

(54) SYSTEM AND METHOD FOR USER MODIFICATION OF METADATA IN A SHELL BROWSER

(75) Inventors: James Brian Kurtz, Seattle, WA (US); Judson Craig Hally, Sammamish, WA (US); David Joel Sheldon, Seattle, WA (US); David George DeVorchik, Seattle, WA (US); Tyler Kien Beam, Redmond, WA (US); Chris J. Guzak, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1151 days.

(21) Appl. No.: 10/395,533

(22) Filed: Mar. 24, 2003

(65) Prior Publication Data

US 2004/0189694 A1 Sep. 30, 2004

(51) Int. Cl.
*G06K 15/00* (2006.01)
(52) U.S. Cl. ...................... 715/771; 715/805
(58) Field of Classification Search ......... 715/744–747, 715/802, 805, 705–712, 811, 821–823, 853–855, 715/826, 775, 771, 762; 707/100, 101; 709/230
See application file for complete search history.

(56) References Cited

U.S. PATENT DOCUMENTS

| 4,214,141 | A | 7/1980 | Okuda et al. |
| 4,438,505 | A | 3/1984 | Yanagiuchi et al. |
| 4,829,423 | A | 5/1989 | Tennant et al. |
| 4,881,179 | A | 11/1989 | Vincent |
| 4,931,935 | A | 6/1990 | Ohira et al. |
| 5,060,135 | A | 10/1991 | Levine et al. |
| 5,241,671 | A | 8/1993 | Reed et al. |
| 5,297,250 | A | 3/1994 | Leroy et al. |
| 5,327,529 | A | 7/1994 | Fults et al. |
| 5,333,266 | A | 7/1994 | Boaz et al. |
| 5,333,315 | A | 7/1994 | Saether et al. |
| 5,388,196 | A | 2/1995 | Pajak et al. |
| 5,418,946 | A | 5/1995 | Mori |
| 5,420,605 | A | 5/1995 | Vouri et al. |

(Continued)

FOREIGN PATENT DOCUMENTS

CN 1421800 11/2001

(Continued)

OTHER PUBLICATIONS

Microsoft Press Pass, "Windows XP is Here!", New York, Oct. 25, 2001.

(Continued)

*Primary Examiner*—Steven P Sax
(74) *Attorney, Agent, or Firm*—Shook Hardy & Bacon, LLP

(57) ABSTRACT

A system and method for user modification of metadata in a shell browser. A group of items and associated metadata values are displayed in a window of the shell browser. An edit control permits user modification of metadata values displayed in the window. The user can modify metadata associated with a welcome pane, a selected item, or multiple selected items. A data structure stored on one or more computer-readable media contains metadata associated with items displayed in a shell browser, including user modifiable metadata which is also displayed in the shell browser.

17 Claims, 9 Drawing Sheets

U.S. PATENT DOCUMENTS

| | | |
|---|---|---|
| 5,461,710 A | 10/1995 | Bloomfield et al. |
| 5,499,364 A | 3/1996 | Klein et al. |
| 5,504,852 A | 4/1996 | Thompson-Rohrlich |
| 5,513,306 A | 4/1996 | Mills et al. |
| 5,544,360 A | 8/1996 | Lewak et al. |
| 5,546,527 A | 8/1996 | Fitzpatrick et al. |
| 5,550,852 A | 8/1996 | Patel et al. |
| 5,559,948 A | 9/1996 | Bloomfield et al. |
| 5,583,982 A | 12/1996 | Matheny et al. |
| 5,590,259 A | 12/1996 | Anderson et al. |
| 5,596,702 A | 1/1997 | Stucka et al. |
| 5,598,524 A | 1/1997 | Johnston, Jr. et al. |
| 5,600,778 A | 2/1997 | Swanson et al. |
| 5,606,669 A | 2/1997 | Bertin et al. |
| 5,625,783 A | 4/1997 | Ezekiel et al. |
| 5,630,042 A | 5/1997 | McIntosh et al. |
| 5,648,795 A | 7/1997 | Vouri |
| 5,652,876 A | 7/1997 | Ashe et al. |
| 5,675,520 A | 10/1997 | Pitt, III et al. |
| 5,680,563 A | 10/1997 | Edelman |
| 5,696,486 A | 12/1997 | Poliquin et al. |
| 5,696,914 A | 12/1997 | Nahaboo et al. |
| 5,710,926 A | 1/1998 | Maurer |
| 5,757,925 A | 5/1998 | Faybishenko |
| 5,760,770 A | 6/1998 | Bliss et al. |
| 5,790,121 A | 8/1998 | Sklar et al. |
| 5,802,516 A | 9/1998 | Shwarts et al. |
| 5,828,376 A | 10/1998 | Solimene et al. |
| 5,831,606 A | 11/1998 | Nakajima et al. |
| 5,835,094 A | 11/1998 | Ermel et al. |
| 5,838,317 A | 11/1998 | Bolnick et al. |
| 5,838,322 A | 11/1998 | Nakajima et al. |
| 5,855,446 A | 1/1999 | Disborg |
| 5,867,163 A | 2/1999 | Kurtenbach |
| 5,870,088 A | 2/1999 | Washington et al. |
| 5,875,446 A | 2/1999 | Brown et al. |
| 5,875,448 A | 2/1999 | Boys et al. |
| 5,878,410 A | 3/1999 | Zbikowski et al. |
| 5,886,694 A | 3/1999 | Breinberg |
| 5,899,995 A | 5/1999 | Millier et al. |
| 5,905,973 A | 5/1999 | Yonezawa et al. |
| 5,907,703 A | 5/1999 | Kronenberg et al. |
| 5,907,837 A | 5/1999 | Ferrel et al. |
| 5,909,540 A | 6/1999 | Carter et al. |
| 5,923,328 A | 7/1999 | Griesmer |
| 5,924,090 A | 7/1999 | Krellenstein |
| 5,929,854 A | 7/1999 | Ross |
| 5,930,801 A | 7/1999 | Falkenhainer et al. |
| 5,933,139 A | 8/1999 | Feigner et al. |
| 5,935,210 A | 8/1999 | Stark |
| 5,973,686 A | 10/1999 | Shimogori et al. |
| 5,987,454 A | 11/1999 | Hobbs |
| 5,987,506 A | 11/1999 | Carter et al. |
| 6,003,040 A | 12/1999 | Mital et al. |
| 6,008,806 A | 12/1999 | Nakajima et al. |
| 6,014,137 A | 1/2000 | Burns |
| 6,016,692 A | 1/2000 | Schaenzer et al. |
| 6,021,262 A | 2/2000 | Cote et al. |
| 6,023,708 A | 2/2000 | Mendez et al. |
| 6,024,843 A | 2/2000 | Anderson et al. |
| 6,025,843 A | 2/2000 | Sklar |
| 6,037,944 A | 3/2000 | Hugh |
| 6,055,540 A | 4/2000 | Snow et al. |
| 6,055,543 A | 4/2000 | Christensen et al. |
| 6,061,059 A | 5/2000 | Taylor et al. |
| 6,061,692 A | 5/2000 | Thomas et al. |
| 6,061,695 A | 5/2000 | Slivka et al. |
| 6,065,012 A | 5/2000 | Balsara et al. |
| 6,078,924 A | 6/2000 | Ainsbury et al. |
| 6,097,389 A | 8/2000 | Morris et al. |
| 6,101,509 A | 8/2000 | Hanson |
| 6,144,968 A | 11/2000 | Zellweger |
| 6,147,601 A | 11/2000 | Sandelman et al. |
| 6,160,552 A | 12/2000 | Wilsher |
| 6,175,364 B1 | 1/2001 | Wong et al. |
| 6,181,342 B1 | 1/2001 | Niblack |
| 6,182,068 B1 | 1/2001 | Culliss |
| 6,195,650 B1 | 2/2001 | Gaither et al. |
| 6,202,061 B1 | 3/2001 | Khosla et al. |
| 6,208,985 B1 | 3/2001 | Krehel |
| 6,216,122 B1 | 4/2001 | Elson |
| 6,237,004 B1 | 5/2001 | Dodson et al. |
| 6,237,011 B1 | 5/2001 | Ferguson et al. |
| 6,240,407 B1 | 5/2001 | Chang et al. |
| 6,240,421 B1 | 5/2001 | Stolarz |
| 6,243,094 B1 | 6/2001 | Sklar |
| 6,243,724 B1 | 6/2001 | Mander et al. ............ 707/526 |
| 6,246,411 B1 | 6/2001 | Strauss |
| 6,256,031 B1 | 7/2001 | Meijer et al. |
| 6,268,852 B1 | 7/2001 | Lindhorst et al. |
| 6,271,846 B1 | 8/2001 | Martinez et al. |
| 6,275,829 B1 | 8/2001 | Angiulo et al. |
| 6,279,016 B1 | 8/2001 | De Vorchik et al. |
| 6,301,586 B1 | 10/2001 | Yang et al. |
| 6,308,173 B1 | 10/2001 | Glasser et al. |
| 6,317,142 B1 | 11/2001 | Decoste et al. |
| 6,324,541 B1 | 11/2001 | de l'Etraz et al. |
| 6,324,551 B1 | 11/2001 | Lamping et al. |
| 6,326,953 B1 | 12/2001 | Wana |
| 6,330,007 B1 | 12/2001 | Isreal et al. |
| 6,339,767 B1 | 1/2002 | Rivette et al. |
| 6,341,280 B1 | 1/2002 | Glass et al. |
| 6,342,907 B1 | 1/2002 | Petty et al. |
| 6,356,863 B1 | 3/2002 | Sayle |
| 6,356,915 B1 | 3/2002 | Chtchetkine et al. |
| 6,363,377 B1 | 3/2002 | Kravets et al. |
| 6,363,400 B1 | 3/2002 | Chtchetkine et al. |
| 6,369,840 B1 | 4/2002 | Barnett et al. |
| 6,377,283 B1 | 4/2002 | Thomas et al. |
| 6,393,429 B1 | 5/2002 | Yagi et al. |
| 6,401,097 B1 | 6/2002 | McCotter et al. |
| 6,405,265 B1 | 6/2002 | Kronenberg et al. |
| 6,408,298 B1 | 6/2002 | Van et al. |
| 6,411,311 B1 | 6/2002 | Rich et al. |
| 6,425,120 B1 | 7/2002 | Morganelli et al. |
| 6,425,121 B1 | 7/2002 | Phillips et al. |
| 6,430,575 B1 | 8/2002 | Dourish et al. |
| 6,437,807 B1 | 8/2002 | Berquist et al. |
| 6,438,590 B1 | 8/2002 | Gartner et al. |
| 6,448,985 B1 | 9/2002 | McNally |
| 6,453,311 B1 | 9/2002 | Powers, III |
| 6,453,319 B1 | 9/2002 | Mattis et al. |
| 6,462,762 B1 | 10/2002 | Ku |
| 6,466,228 B1 | 10/2002 | Ulrich et al. |
| 6,466,238 B1 | 10/2002 | Berry et al. |
| 6,466,932 B1 | 10/2002 | Dennis et al. |
| 6,470,344 B1 * | 10/2002 | Kothuri et al. ............ 707/100 |
| 6,473,100 B1 | 10/2002 | Beaumont et al. |
| 6,480,835 B1 | 11/2002 | Light |
| 6,483,525 B1 | 11/2002 | Tange et al. |
| 6,505,233 B1 | 1/2003 | Hanson et al. |
| 6,513,038 B1 | 1/2003 | Hasegawa et al. |
| 6,519,612 B1 | 2/2003 | Howard et al. |
| 6,526,399 B1 | 2/2003 | Coulson et al. |
| 6,535,229 B1 | 3/2003 | Kraft |
| 6,535,230 B1 | 3/2003 | Celik |
| 6,539,399 B1 | 3/2003 | Hazama et al. |
| 6,544,295 B1 | 4/2003 | Bodnar et al. |
| 6,549,217 B1 | 4/2003 | De Greef et al. |
| 6,549,916 B1 | 4/2003 | Sedlar |
| 6,563,514 B1 * | 5/2003 | Samar ................ 715/711 |
| 6,571,245 B2 | 5/2003 | Huang et al. |
| 6,573,906 B1 * | 6/2003 | Harding et al. ............ 715/711 |
| 6,573,907 B1 | 6/2003 | Madrane |

| | | |
|---|---|---|
| 6,583,799 B1 | 6/2003 | Manolis et al. |
| 6,590,585 B1 | 7/2003 | Suzuki et al. |
| 6,606,105 B1 | 8/2003 | Quartetti |
| 6,613,101 B2 | 9/2003 | Mander et al. ............... 715/526 |
| 6,628,309 B1 | 9/2003 | Dodson et al. |
| 6,636,238 B1 | 10/2003 | Amir et al. |
| 6,636,250 B1 | 10/2003 | Gasser |
| 6,638,313 B1 | 10/2003 | Freeman et al. |
| 6,658,406 B1 | 12/2003 | Mazner et al. |
| 6,662,198 B2 | 12/2003 | Satyanarayanan et al. |
| 6,684,222 B1 | 1/2004 | Cornelius et al. |
| 6,721,760 B1 | 4/2004 | Ono et al. |
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,611 B2 | 6/2004 | Krupin et al. |
| 6,751,626 B2 | 6/2004 | Brown et al. |
| 6,754,829 B1 | 6/2004 | Butt et al. |
| 6,760,721 B1 | 7/2004 | Chasen et al. |
| 6,760,722 B1 | 7/2004 | Raghunandan |
| 6,762,776 B2 | 7/2004 | Huapaya |
| 6,762,777 B2 * | 7/2004 | Carroll ....................... 715/808 |
| 6,763,458 B1 | 7/2004 | Watanabe et al. |
| 6,763,777 B1 | 7/2004 | Rosenberg |
| 6,768,999 B2 | 7/2004 | Prager et al. |
| 6,784,900 B1 | 8/2004 | Dobronsky et al. |
| 6,784,925 B1 | 8/2004 | Tomat et al. |
| 6,795,094 B1 | 9/2004 | Watanabe et al. |
| 6,801,909 B2 | 10/2004 | Delgado et al. |
| 6,801,919 B2 | 10/2004 | Hunt et al. |
| 6,803,926 B1 | 10/2004 | Lamb et al. |
| 6,810,404 B1 | 10/2004 | Ferguson et al. |
| 6,813,474 B2 | 11/2004 | Robinson et al. |
| 6,816,863 B2 | 11/2004 | Bates et al. |
| 6,820,083 B1 | 11/2004 | Nagy et al. |
| 6,823,344 B1 | 11/2004 | Isensee et al. |
| 6,826,443 B2 | 11/2004 | Makinen |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,900 B2 | 4/2005 | Takeda |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,885,860 B2 | 4/2005 | Bahl |
| 6,906,722 B2 | 6/2005 | Hrebejk et al. |
| 6,910,049 B2 | 6/2005 | Fenton et al. |
| 6,922,709 B2 | 7/2005 | Goodman |
| 6,925,608 B1 | 8/2005 | Neale et al. |
| 6,938,207 B1 * | 8/2005 | Haynes ....................... 715/711 |
| 6,944,647 B2 | 9/2005 | Shah et al. |
| 6,947,959 B1 | 9/2005 | Gill |
| 6,948,120 B1 | 9/2005 | Delgobbo et al. |
| 6,950,818 B2 | 9/2005 | Dennis et al. |
| 6,950,989 B2 | 9/2005 | Rosenzweig et al. |
| 6,952,714 B2 | 10/2005 | Peart |
| 6,952,724 B2 | 10/2005 | Prust |
| 6,980,993 B2 | 12/2005 | Horvitz et al. |
| 6,983,424 B1 | 1/2006 | Dutta |
| 7,010,755 B2 | 3/2006 | Anderson et al. |
| 7,024,427 B2 | 4/2006 | Bobbitt et al. |
| 7,028,262 B2 | 4/2006 | Estrada et al. |
| 7,043,472 B2 | 5/2006 | Aridor et al. |
| 7,047,498 B2 | 5/2006 | Lui et al. |
| 7,051,291 B2 | 5/2006 | Sciammarella et al. |
| 7,058,891 B2 | 6/2006 | O'Neal et al. |
| 7,062,500 B1 | 6/2006 | Hall et al. |
| 7,062,718 B2 | 6/2006 | Kodosky et al. |
| 7,068,291 B1 | 6/2006 | Roberts et al. |
| 7,100,150 B2 | 8/2006 | Polk |
| 7,106,843 B1 | 9/2006 | Gainsboro |
| 7,139,811 B2 | 11/2006 | Lev Ran et al. |
| 7,149,729 B2 | 12/2006 | Kaasten et al. |
| 7,162,466 B2 | 1/2007 | Kaasten et al. |
| 7,168,051 B2 | 1/2007 | Robinson et al. |
| 7,194,743 B2 | 3/2007 | Hayton et al. |
| 7,203,948 B2 | 4/2007 | Mukundan et al. |
| 7,216,289 B2 * | 5/2007 | Kagle et al. ................. 715/256 |
| 7,216,301 B2 | 5/2007 | Moehrle |
| 7,219,302 B1 | 5/2007 | O'Shaughnessy et al. |
| 7,240,292 B2 | 7/2007 | Hally et al. |
| 7,243,334 B1 | 7/2007 | Berger et al. |
| 7,275,063 B2 | 9/2007 | Horn |
| 7,278,106 B1 | 10/2007 | Mason |
| 7,290,245 B2 | 10/2007 | Skjolsvold |
| 7,293,031 B1 | 11/2007 | Dusker et al. |
| 7,383,494 B2 | 6/2008 | Krolczyk et al. |
| 7,409,382 B2 | 8/2008 | Kido |
| 7,409,644 B2 | 8/2008 | Moore et al. |
| 7,415,484 B1 | 8/2008 | Tulkoff et al. |
| 7,499,925 B2 | 3/2009 | Moore et al. |
| 7,526,483 B2 | 4/2009 | Samji et al. |
| 7,536,386 B2 | 5/2009 | Samji et al. |
| 7,627,552 B2 | 12/2009 | Moore et al. |
| 2001/0034733 A1 | 10/2001 | Prompt et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0010736 A1 | 1/2002 | Marques et al. |
| 2002/0019935 A1 | 2/2002 | Andrew et al. |
| 2002/0021828 A1 | 2/2002 | Papier et al. |
| 2002/0033844 A1 | 3/2002 | Levy et al. |
| 2002/0046209 A1 | 4/2002 | De Bellis |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0063734 A1 | 5/2002 | Khalfay et al. |
| 2002/0070965 A1 | 6/2002 | Austin |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0087652 A1 | 7/2002 | Davis et al. |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0100039 A1 | 7/2002 | Iatropoulos et al. |
| 2002/0103998 A1 | 8/2002 | DeBruine |
| 2002/0104069 A1 | 8/2002 | Gouge et al. |
| 2002/0107973 A1 * | 8/2002 | Lennon et al. ............... 709/231 |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120604 A1 | 8/2002 | Labarge et al. |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0144155 A1 | 10/2002 | Bate et al. |
| 2002/0149888 A1 * | 10/2002 | Motonishi et al. ........... 360/323 |
| 2002/0152262 A1 | 10/2002 | Arkin et al. |

| | | | |
|---|---|---|---|
| 2002/0152267 A1* | 10/2002 | Lennon .................. 709/203 | |
| 2002/0156756 A1 | 10/2002 | Stanley et al. | |
| 2002/0156895 A1 | 10/2002 | Brown | |
| 2002/0161800 A1 | 10/2002 | Eld et al. | |
| 2002/0163572 A1 | 11/2002 | Center et al. | |
| 2002/0169678 A1 | 11/2002 | Chao et al. | |
| 2002/0174329 A1 | 11/2002 | Bowler et al. | |
| 2002/0181398 A1 | 12/2002 | Szlam | |
| 2002/0184357 A1 | 12/2002 | Traversat et al. | |
| 2002/0188605 A1 | 12/2002 | Adya et al. | |
| 2002/0188621 A1 | 12/2002 | Flank et al. | |
| 2002/0188735 A1 | 12/2002 | Needham et al. | |
| 2002/0194252 A1 | 12/2002 | Powers, III | |
| 2002/0196276 A1* | 12/2002 | Corl et al. ............... 345/744 | |
| 2002/0199061 A1 | 12/2002 | Friedman et al. | |
| 2003/0001964 A1 | 1/2003 | Masukura et al. | |
| 2003/0009484 A1 | 1/2003 | Hamanaka et al. | |
| 2003/0014415 A1 | 1/2003 | Weiss et al. | |
| 2003/0018657 A1 | 1/2003 | Monday | |
| 2003/0018712 A1 | 1/2003 | Harrow et al. | |
| 2003/0028610 A1 | 2/2003 | Pearson | |
| 2003/0033367 A1 | 2/2003 | Itoh | |
| 2003/0037060 A1 | 2/2003 | Kuehnel | |
| 2003/0041178 A1 | 2/2003 | Brouk et al. | |
| 2003/0046011 A1 | 3/2003 | Friedman | |
| 2003/0046260 A1 | 3/2003 | Satyanarayanan et al. | |
| 2003/0063124 A1 | 4/2003 | Melhem et al. | |
| 2003/0069893 A1 | 4/2003 | Kanai et al. | |
| 2003/0069908 A1 | 4/2003 | Anthony et al. | |
| 2003/0074356 A1 | 4/2003 | Kaier et al. | |
| 2003/0076322 A1 | 4/2003 | Ouzts et al. | |
| 2003/0078918 A1 | 4/2003 | Souvignier et al. | |
| 2003/0079038 A1 | 4/2003 | Robbin et al. | |
| 2003/0081002 A1 | 5/2003 | De Vorchik et al. | |
| 2003/0081007 A1 | 5/2003 | Cyr et al. | |
| 2003/0084425 A1* | 5/2003 | Glaser .................. 717/110 | |
| 2003/0085918 A1 | 5/2003 | Beaumont et al. | |
| 2003/0093321 A1 | 5/2003 | Bodmer et al. | |
| 2003/0093531 A1 | 5/2003 | Yeung et al. | |
| 2003/0093580 A1 | 5/2003 | Thomas et al. | |
| 2003/0097361 A1 | 5/2003 | Huang et al. | |
| 2003/0098881 A1* | 5/2003 | Nolte et al. ............... 345/764 | |
| 2003/0098893 A1 | 5/2003 | Makinen et al. | |
| 2003/0098894 A1 | 5/2003 | Sheldon | |
| 2003/0101200 A1 | 5/2003 | Koyama et al. | |
| 2003/0105745 A1 | 6/2003 | Davidson et al. | |
| 2003/0107597 A1 | 6/2003 | Jameson | |
| 2003/0110188 A1 | 6/2003 | Howard et al. | |
| 2003/0115218 A1 | 6/2003 | Bobbitt et al. | |
| 2003/0117403 A1 | 6/2003 | Park et al. | |
| 2003/0117422 A1 | 6/2003 | Hiyama et al. | |
| 2003/0120678 A1 | 6/2003 | Hill et al. | |
| 2003/0120928 A1 | 6/2003 | Cato et al. | |
| 2003/0120952 A1 | 6/2003 | Tarbotton et al. | |
| 2003/0122873 A1* | 7/2003 | Dieberger et al. .......... 345/764 | |
| 2003/0126136 A1* | 7/2003 | Omoigui .................. 707/10 | |
| 2003/0126212 A1 | 7/2003 | Morris et al. | |
| 2003/0135495 A1 | 7/2003 | Vagnozzi | |
| 2003/0135513 A1 | 7/2003 | Quinn et al. | |
| 2003/0135517 A1 | 7/2003 | Kauffman | |
| 2003/0135659 A1* | 7/2003 | Bellotti et al. ............ 709/313 | |
| 2003/0140115 A1 | 7/2003 | Mehra | |
| 2003/0154185 A1 | 8/2003 | Suzuki et al. | |
| 2003/0158855 A1 | 8/2003 | Farnham et al. | |
| 2003/0177422 A1 | 9/2003 | Tararoukhine et al. | |
| 2003/0184587 A1 | 10/2003 | Ording et al. | |
| 2003/0195950 A1 | 10/2003 | Huang et al. | |
| 2003/0210281 A1 | 11/2003 | Ellis et al. | |
| 2003/0212664 A1 | 11/2003 | Breining | |
| 2003/0212680 A1 | 11/2003 | Bates et al. | |
| 2003/0212710 A1 | 11/2003 | Guy | |
| 2003/0222915 A1 | 12/2003 | Marion et al. | |
| 2003/0225796 A1 | 12/2003 | Matsubara | |
| 2003/0227480 A1 | 12/2003 | Polk | |
| 2003/0227487 A1 | 12/2003 | Hugh | |
| 2003/0233419 A1 | 12/2003 | Beringer | |
| 2004/0001106 A1* | 1/2004 | Deutscher et al. .......... 345/838 |
| 2004/0002993 A1 | 1/2004 | Toussaint et al. | |
| 2004/0003247 A1 | 1/2004 | Fraser et al. | |
| 2004/0004638 A1 | 1/2004 | Babaria | |
| 2004/0006549 A1* | 1/2004 | Mullins et al. ............. 707/1 |
| 2004/0008226 A1 | 1/2004 | Manolis et al. | |
| 2004/0019584 A1 | 1/2004 | Greening et al. | |
| 2004/0019655 A1 | 1/2004 | Uemura et al. | |
| 2004/0019875 A1 | 1/2004 | Welch | |
| 2004/0030731 A1 | 2/2004 | Iftode et al. | |
| 2004/0044696 A1 | 3/2004 | Frost | |
| 2004/0044776 A1 | 3/2004 | Larkin | |
| 2004/0054674 A1 | 3/2004 | Carpenter et al. | |
| 2004/0056894 A1 | 3/2004 | Zaika et al. | |
| 2004/0056896 A1 | 3/2004 | Doblmayr et al. | |
| 2004/0059755 A1 | 3/2004 | Farrington et al. | |
| 2004/0068524 A1 | 4/2004 | Aboulhosn et al. | |
| 2004/0070612 A1 | 4/2004 | Sinclair et al. | |
| 2004/0073705 A1 | 4/2004 | Madril, Jr. et al. | |
| 2004/0083433 A1 | 4/2004 | Takeya | |
| 2004/0085581 A1 | 5/2004 | Tonkin | |
| 2004/0088374 A1 | 5/2004 | Webb et al. | |
| 2004/0091175 A1 | 5/2004 | Beyrouti | |
| 2004/0098370 A1 | 5/2004 | Garland et al. | |
| 2004/0098379 A1 | 5/2004 | Huang | |
| 2004/0098742 A1 | 5/2004 | Hsieh et al. | |
| 2004/0103073 A1 | 5/2004 | Blake et al. | |
| 2004/0103280 A1 | 5/2004 | Balfanz et al. | |
| 2004/0105127 A1 | 6/2004 | Cudd et al. | |
| 2004/0117358 A1 | 6/2004 | von Kaenel et al. | |
| 2004/0117405 A1 | 6/2004 | Short et al. | |
| 2004/0128322 A1 | 7/2004 | Nagy | |
| 2004/0133572 A1 | 7/2004 | Bailey et al. | |
| 2004/0133588 A1 | 7/2004 | Kiessig et al. | |
| 2004/0133845 A1 | 7/2004 | Forstall et al. | |
| 2004/0142749 A1 | 7/2004 | Ishimaru et al. | |
| 2004/0143349 A1 | 7/2004 | Roberts | |
| 2004/0148434 A1 | 7/2004 | Matsubara et al. | |
| 2004/0153451 A1 | 8/2004 | Phillips et al. | |
| 2004/0153968 A1* | 8/2004 | Ching et al. ............... 715/513 |
| 2004/0167942 A1 | 8/2004 | Oshinsky et al. | |
| 2004/0168118 A1* | 8/2004 | Wong et al. .............. 715/500.1 |
| 2004/0174396 A1 | 9/2004 | Jobs et al. | |
| 2004/0177116 A1 | 9/2004 | McConn et al. | |
| 2004/0177148 A1 | 9/2004 | Tsimelzon, Jr. | |
| 2004/0177319 A1* | 9/2004 | Horn .................... 715/501.1 |
| 2004/0181516 A1 | 9/2004 | Ellwanger et al. | |
| 2004/0183824 A1 | 9/2004 | Benson et al. | |
| 2004/0189704 A1 | 9/2004 | Walsh et al. | |
| 2004/0189707 A1 | 9/2004 | Moore et al. | |
| 2004/0193594 A1 | 9/2004 | Moore et al. | |
| 2004/0193599 A1 | 9/2004 | Liu et al. | |
| 2004/0193600 A1 | 9/2004 | Kaasten et al. | |
| 2004/0193621 A1 | 9/2004 | Moore et al. | |
| 2004/0193672 A1 | 9/2004 | Samji et al. | |
| 2004/0193673 A1 | 9/2004 | Samji et al. | |
| 2004/0199507 A1 | 10/2004 | Tawa | |
| 2004/0205168 A1 | 10/2004 | Asher | |
| 2004/0205625 A1 | 10/2004 | Banatwala et al. | |
| 2004/0205633 A1 | 10/2004 | Martinez et al. | |
| 2004/0205698 A1 | 10/2004 | Schliesmann et al. | |
| 2004/0215600 A1 | 10/2004 | Aridor et al. | |
| 2004/0220899 A1 | 11/2004 | Barney et al. | |
| 2004/0223057 A1 | 11/2004 | Oura et al. | |
| 2004/0225650 A1 | 11/2004 | Cooper et al. | |
| 2004/0230572 A1* | 11/2004 | Omoigui .................. 707/3 |
| 2004/0230599 A1 | 11/2004 | Moore et al. | |
| 2004/0230917 A1 | 11/2004 | Bales et al. | |
| 2004/0233235 A1 | 11/2004 | Rubin et al. | |
| 2004/0243597 A1 | 12/2004 | Jensen et al. | |

| | | | |
|---|---|---|---|
| 2004/0249902 A1 | 12/2004 | Tadayon et al. | |
| 2004/0255048 A1 | 12/2004 | Lev Ran et al. | |
| 2004/0257169 A1 | 12/2004 | Nelson | |
| 2005/0004928 A1 | 1/2005 | Hamer et al. | |
| 2005/0010860 A1 | 1/2005 | Weiss et al. | |
| 2005/0015405 A1 | 1/2005 | Plastina et al. | |
| 2005/0022132 A1 | 1/2005 | Herzberg et al. | |
| 2005/0027757 A1 | 2/2005 | Kiessig et al. | |
| 2005/0050470 A1* | 3/2005 | Hudson et al. | 715/711 |
| 2005/0055306 A1 | 3/2005 | Miller et al. | |
| 2005/0071355 A1 | 3/2005 | Cameron et al. | |
| 2005/0080807 A1 | 4/2005 | Beilinson et al. | |
| 2005/0097477 A1 | 5/2005 | Camara et al. | |
| 2005/0114672 A1 | 5/2005 | Duncan et al. | |
| 2005/0120242 A1 | 6/2005 | Mayer et al. | |
| 2005/0131903 A1 | 6/2005 | Margolus et al. | |
| 2005/0131905 A1 | 6/2005 | Margolus et al. | |
| 2005/0138567 A1 | 6/2005 | Smith et al. | |
| 2005/0149481 A1 | 7/2005 | Hesselink et al. | |
| 2005/0165753 A1 | 7/2005 | Chen et al. | |
| 2005/0166159 A1 | 7/2005 | Mondry et al. | |
| 2005/0166189 A1 | 7/2005 | Ma | |
| 2005/0171947 A1 | 8/2005 | Gautestad | |
| 2005/0192953 A1 | 9/2005 | Neale et al. | |
| 2005/0192966 A1 | 9/2005 | Hilbert et al. | |
| 2005/0243993 A1 | 11/2005 | McKinzie et al. | |
| 2005/0246331 A1 | 11/2005 | De Vorchik et al. | |
| 2005/0246643 A1 | 11/2005 | Gusmorino et al. | |
| 2005/0246664 A1* | 11/2005 | Michelman et al. | 715/856 |
| 2005/0256909 A1 | 11/2005 | Aboulhosn et al. | |
| 2005/0257169 A1 | 11/2005 | Tu | |
| 2005/0283476 A1 | 12/2005 | Kaasten et al. | |
| 2006/0004692 A1 | 1/2006 | Kaasten et al. | |
| 2006/0020586 A1 | 1/2006 | Prompt et al. | |
| 2006/0036568 A1 | 2/2006 | Moore et al. | |
| 2006/0053066 A1* | 3/2006 | Sherr et al. | 705/26 |
| 2006/0053388 A1 | 3/2006 | Michelman | |
| 2006/0059204 A1 | 3/2006 | Borthakur et al. | |
| 2006/0080308 A1 | 4/2006 | Carpentier et al. | |
| 2006/0090137 A1 | 4/2006 | Cheng et al. | |
| 2006/0129627 A1 | 6/2006 | Phillips et al. | |
| 2006/0173873 A1 | 8/2006 | Prompt et al. | |
| 2006/0200455 A1 | 9/2006 | Wilson | |
| 2006/0200466 A1 | 9/2006 | Kaasten et al. | |
| 2006/0200832 A1 | 9/2006 | Dutton | |
| 2006/0218122 A1 | 9/2006 | Poston et al. | |
| 2006/0277432 A1* | 12/2006 | Patel et al. | 714/6 |
| 2007/0168885 A1 | 7/2007 | Muller et al. | |
| 2007/0180432 A1* | 8/2007 | Gassner et al. | 717/136 |
| 2007/0186183 A1 | 8/2007 | Hudson | |

FOREIGN PATENT DOCUMENTS

| | | |
|---|---|---|
| EP | 1235137 | 8/2002 |
| GB | 2329492 | 3/1999 |
| JP | 2005089173 | 4/1993 |
| JP | 1998054398 | 9/1997 |
| JP | 2001067250 | 3/2001 |
| JP | 2001142766 | 5/2001 |
| JP | 2001154831 | 6/2001 |
| JP | 2001188702 | 7/2001 |
| JP | 2002099565 | 4/2002 |
| JP | 2002140216 | 5/2002 |
| JP | 2002182953 | 6/2002 |
| JP | 2002334103 | 11/2002 |
| JP | 2002269145 | 4/2004 |
| RU | 2347258 | 2/2009 |
| WO | 9322738 | 11/1993 |
| WO | 9412944 | 6/1994 |
| WO | 9414281 | 6/1994 |
| WO | 9938092 | 7/1999 |
| WO | 9949663 | 9/1999 |
| WO | 0051021 | 8/2000 |
| WO | 01/63919 A1 | 8/2001 |
| WO | 0157867 | 8/2001 |
| WO | 0163919 | 8/2001 |
| WO | 0167668 | 9/2001 |
| WO | WO 0225420 | 3/2002 |
| WO | 03001720 | 1/2003 |
| WO | WO2004107151 | 9/2004 |
| WO | 2004097680 | 11/2004 |

OTHER PUBLICATIONS

Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.

McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.

Stanek R. William, "Microsoft Windows XP Professional Administrator's Pocket Consultant", Sep. 25, 2001; Microsoft Press, Chapter 9, printed pp. 1-8.

Shah, Sarju, "Windows XP Preview", FiringSquad, May 4, 2001, online, printed pp. 1-5; Figure: Hi-Res Image Viewer.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghisler.com/feature1.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Wikipedia, File Allocation Table, 2006, <http://en.wikipedia.org/wiki/File_Allocation_Table>.

Written Opinion of Singapore Application No. 200403220-7 dated May 18, 2006.

McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.

Langer, Maria, Mac OS X: Visual QuickStart Guide; Apr. 2001, Peachpit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

International Search Report and Written Opinion of PCT/US04/25931 dated Apr. 3, 2007.

Kuchinsky, et al., "FotoFile: A Consumer Multimedia Organization and Retrieval System", May 1999, ACM, pp. 496-503.

Written Opinion of SG 200301764-7 dated Jan. 11, 2007.

Windows Commander (website), <URL: http://www.ghisler.com>, accessed using http://www.archive.org/web/web.php, in particular, http://web.archive.org/web/20030207145141/www.ghisler.com/ featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.

Bott, et al., "Microsoft Windows XP Inside Out", Microsoft Press, 2001, Chapter 11, 39 pages.

Bott, et al., Book titled "Special Edition Using Windows 98, Second Edition", Dec. 21, 1999, second edition, pp. 1-7.

Supplementary European Search Report for EP 04780390 dated Jun. 18, 2007.

Russian Official Action and English Translation of Official Action for Application No. 2003114526/09 dated May 11, 2007, 7 pages.

Grosky, et al., "Using Metadata for Intelligent Browsing of Structured Media Objects", Dec. 1994, Sigmond Record, vol. 23, No. 4, pp. 49-56.

International Search Report for PCT/US06/26854 dated Sep. 25, 2007.

Examination Report for New Zealand Patent No. 534665 dated Jul. 27, 2007.

Olivie, et al., "A Generic Metadata Query Tool", 1999, pp. 1-8.

Rathbone, Windows XP for Dummies, 2001, Wiley Publishing, Inc. pp. 145, 203 and 204.

Microsoft Windows XP Professional, 1985-2001.

"An Object-Oriented Model for a Multi-media Patient Folder Management System"—Fernando Ferri, Domenico M. Pisanelli & Fabrizio L. Ricci—ACM SIBGIO Newsletter, vol. 16, Issue 1, (Jun. 1996), (pp. 2-18).

Anonymous, "Organize Your Digital Media Collection," www.microsoft.com/windowsxp/using/windowsmediaplayer/getstarted/organize.mspx, Jun. 30, 2003, 3 pages.

"A Tamper-Resistant and Portable Healthcare Folder"—Anciaux et al.—Hindawai Publishing Corporation, International Journal of Telemedicine and Applications—vol. 1995, Article ID 763534, (pp. 1-9).

Australian Search Report for SG 200301757-1 dated Dec. 1, 2004.

Cohen, J., "The Unofficial Guide to the Workplace Shell," Apr. 5, 1992, XP002227246, 45 pp., retrieved from Internet, http://www.verfasser.de/web/web.nsf/c5.

Cooper, A., About Face The Essentials of User Interface Design, IDG Books, 1995, p. 141.

David Campbell, "Extending the Windows Explorer with Name Space Extensions," Microsoft Systems Journal, Microsoft co., vol. 5, No. 6, Jul. 1996, pp. 89-96.

Dorot V., Explanatory Dictionary on Modern Computer Vocabulary, S. Petersburg, BHV-Petersburg, pp. 218-219. (Attached).

Ed Bott et al., "Master Your Music Library," www.microsoft.com/windowsxp/using/windowsmediaplayer/expert/bott_03may05.mspx, May 5, 2003, 7 pages.

Office Action for CN03801850.0, dated Aug. 10, 2007.

Esposito, Dino, More Windows 2000 UI Goodies: Extending Explorer Views by Customizing Hypertext Template Files, first date of publication unknown, but prior to Jun. 16, 2006, 15 pages.

European Search Report dated Sep. 20, 2007 for European Patent Application No. 05 10 3492, 5 pages.

Eiji Sugasawa, "When and What of Pictures Become Clear! How to Readily Organize Images from Digital Cameras," Nikkei PC Beginers, vol. 2, pp. 78-95, vol. *, No. 4, Nikkei Business Publications, Inc., Japan.

"How knowledge workers use the web"—Abigail J. Sellen, Rachel Murphy and Kate L. Shaw—conference on Human Factors in Computing Systems, Proceedings of the SIGCHI conference on Human Factors in Computing Systems: Changing our world, changing ourselves—ACM—2002 (pp. 227-234).

"Implementing Windows Terminal Server and Citrix MetaFrame on IBM @server x Series Servers"—Darryl Miles—Apr. 2003 (pp. 1-62).

International Search Report and Written Opinion of PCT/US05/26655 dated Mar. 21, 2006.

International Search Report dated Dec. 7, 2005 for PCT Application Serial No. PCT/US05/13589, 5 pages.

International Search Report of EP 03007786 dated Aug. 6, 2004.

International Search Report of EP 0315717 dated Aug. 26, 2003.

International Search Report of EP 03007909 dated Jun. 13, 2006.

International Search Report of PCT/US03/15625 dated Aug. 8, 2003.

International Search Report of PCT/US05/13589 dated Apr. 22, 2005.

International Search Report of PCT/US05/27258 dated Aug. 1, 2005.

Jamsa, K., 1001 Windows 98 Tips, Jamsa Press, 1998, 2 pages.

International Search Report of PCT/US05/26655 dated Jun. 23, 2005.

Kumiko Sekiguchi, "Visual Basic Q&A," msdn magazine 2001, No. 16, pp. 97-103, ASCII Inc., Japan, Jul. 18, 2001.

Luiz F. Capretz et al., "Component-Based Software Development," IECON'01: The 27th Annual Conference of the IEEE Industrial Electronics Society, IEEE, Nov. 2001, pp. 1834-1837.

Mark Russionovich, "Internal Structure of NTFS4.0-Second Volume," Nikkei Windows 2000, No. 53. pp. 176-182, Nikkei Business Publications, Inc., Japan, Aug. 1, 2001.

Michael Halvorson and Michael Young, Microsoft Office XP, Professional Official Manual, 1st Ed., Nikkei BP Soft Press, Jul. 23, 2001, pp. 78-80.

Microsoft: "Microsoft Windows 2000 Professional Step by Step—Lesson 3—Managing Files and Folders" <http://www.microsoft.com/mspress/books/sampshap/1589.asp>, first date of publications unknown, but prior to Jun. 12, 2006, 12 pages.

Microsoft Press, Windows 98 Step by Step, Microsoft Corporation, p. 63, 1998.

Microsoft, Windows XP Professional, Screen Shots 1-8, copyright (1985-2001).

Domoto, Kenji et al., "The Power of Fast Full Text Search," Nikkei Byte, No. 156, pp. 142-167, Nikkei Business Publications, Inc., Japan, Sep. 22, 1996 (Previously delivered.).

Patent Abstracts of Japan, Publication No. 2002-099565, date of publication of application Apr. 5, 2002, 1 page, Information Retrieval Apparatus, Abstract.

Patent Abstracts of Japan, Publication No. 2002-334103, date of publication of application Nov. 22, 2002, 1 page, Retrieval Processing System and Retrieval Processing Method, Abstract.

"Presto: an experimental architecture for fluid interactive document spaces"—Paul Dourish, W. keith Edwards, Anthony LaMarca and Michael Salisbury—ACM Transactions on Computer-human Interaction (TOCHI) vol. 6, Issue 2 ACM Jun. 1999 (pp. 133-161).

"PSM_HWNDTOINDEX Message"; downloaded from <http://msdn.microsoft.com>; date of first publication prior to Mar. 31, 2005; 1 page.

MessageBoxFunction; downloaded from <http://msdn.microsoft.com>; date of first publication prior to Mar. 31, 2005; 4 pages.

Examination Report for New Zealand Patent No. 534665, 2 pages.

Microsoft Windows XP Verison 2002 Screen Dumps.

Mozilla.org, "Mozilla Firebird's Features", Dec. 4, 2003, Section—Find as you Type.

Netscape Corporation, "Mozilla.org Find As You Type," Sep. 12, 2003, pp. 1-4.

Nishimasa, Makoto, "Easily Creating a Network by Using Standard Features, Home Network Easily Realized Using Windows 2000," Windows 2000 World, vol. 6, No. 2, pp. 126-133, IDG Japan, Inc., Japan, Feb. 1, 2001.

Pogue, David, "Windows XP Home Edition: The Missing Manual", O'Reilly, 2001.

Takane, Hideya et al., "Control of Access to Folders and Files," Windows NT World, vol. 5, No. 5, pp. 160-165, IDG Japan, Inc., Japan, May 1, 2000.

Tanaka, Yuji, "Utilization Report, Introduction of 'Convenient Techniques' Which Are Unexpectedly Unknown, Advanced Techniques for 'Compression and Decompression,'" Nikkei PC 21, vol. 7, No. 21, pp. 100-105, Nikkei Business Publications, Inc., Japan, Nov. 1, 2002.

International Search Report for WO2004/097638 A1 (McKee, et al.) dated Nov. 11, 2004.

Verhoeven et al., A Generic Metadata Tool, 10-19999, pp. 1-8.

Revelle, A Visual Search Tool for Early Elementary Science Students, Mar. 2002, Journal of Science Education and Technology, vol. 11, pp. 49-57.

"Survey of Some Mobile Agent System"—Zhujun (James) Xu—Feb. 10, 2003 (p. 1-22).

Tony Northrup et al., "Plus! Party Mode: Mix Audio and Video in Playlists," www.microsoft.com/windowsxp/using/windowsmediaplayer/expert/northrup_03march17.mspx, Mar. 17, 2003, 6 pages.

"How Easy! Introduction to 'Storage Idea,'" Nikkei PC 21, vol. 6, No. 1, pp. 46-53, Nikkei Business Publications, Inc., Japan, Jan. 1, 2001.

Microsoft Windows XP Version 2002 (Screen Dumps, Figs. 1-16).

Simpson, Alan, Windows 95 Uncut, 1995, IDG Books Worldwide, Inc., pp. 104-107.

Feng, et al., "Schemata Transformation of Object-Oriented Conceptual Models to XML", Computer systems Science & Engineering, vol. 18, No. 1, Jan. 2003.

Joseph, M., "The UML for Data Modellers," Elektron, Apr. 2004, pp. 72-73.

Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.

Adobe, Inc., et al, "Adobe Photoshop CS Classroom in a Book," Dec. 1, 2003, pp. 1-29.

Adobe, Inc., et al., "Adobe Photoshop 7.0", 2001; pp. 1-9.

Heinlein, et al., "Integration of Message Passing and Shared Memory in the Stanford FLASH Multiprocessor, Architectural Support for Programming Languages and Operating Systems," pp. 38-50, published 1994.

Louis, et al., "Context Learning Can Improve User Interaction Information Reuse and Integration," Proceedings of the 2004 IEEE International Conference on, pp. 115-120, Nov. 8-10, 2004.

"Predefined Properties" http://help.sap.com/saphelp_ep50sp5/helpdata/en/1a/9a4a3b80f2ec40aa7456bc87a94259/content.htm.

"InfoVision Information Management System" http://66.102.7.104/search?q=cache:m1XV6K6sQ0QJ:www.amlib.net/products/infovision.htm+customised+multi+property+file+navigation&hl=en.

"TdcFolderListView component" http://www.appcontrols.com/manuals/diskcontrols/index.html?tdcfolderlistview.htm.

"Previewing Files" http://developer.apple.com/documentation/QuickTime/INMAC/QT/iqMovieToolbox.1a.htm.

"Previewing Files in the Common Dialog" http://www.elitevb.com/content/01,0084,01/.

"Text File Previewer 2.0 Beta" http://www.freedownloadscenter.com/Utilities/Text_Viewers/Text_File_Previewer.html.

"Your Next OS: Windows 2006?" http://www.pcworld.com/news/article/0,aid,113631,00.asp.

Yong Kyu Lee, et al., Metadata Management of the SANtopia File System, Proceedings of the 8th International Conference on Parallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of The 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australasian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001, pp. 243-252, IEEE Computer Society, 2001, ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Definition Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, et al, Color and Texture Descriptors, IEEE Transactions on Circuits and Systems for Video Technology, Jun. 2001, pp. 703-715, vol. 11, No. 6, IEEE Computer Society, 2001, ISBN 1051-8215.

Lee, J., "An End-User Perspective on File-Sharing Systems," Communications of the ACM 46(2):49-53, Feb. 2003.

Ohtani, A., et al., "A File Sharing Method For Storing Area Network and Its Performance Verification," NEC Res. & Develop. 44(1):85-90, Jan. 2003.

H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.

Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.

R. Rao, et al., "Rich Interaction in the Digital Library," Communications of the ACM 38(4):29-39.1995.

Piernas, J., et al., "DualFS: A New Journaling File System Without Meta-Data Duplication," Conference Proceedings of the 2002 International Conference on Supercomputing, New York, Jun. 22-26, 2002, p. 137-146.

Manber, U., and S. Wu, "GLIMPSE: A Tool to Search Through Entire File Systems," Proceedings of USENIX Winter 1994 Conference, San Francisco, Ca, Jan. 17-21, 1994.

Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.

Gifford, D.K., et al., "Semantic File Systems," Proceedings of the 13th ACM Symposium on Operating Systems Principles, Pacific Grove CA., Sep. 1991, pp. 16-25.

Blair, C., and G.E. Monahan, "Optimal Sequential File Search: A Reduced-State Dynamic Programming Approach," European Journal of Operational Research 86(2):358-365, 1995.

Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.

Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28, 2005; 2 pages.

"Common Dialog Box Library," downloaded from <http://msdn.microsoft.com>: date of first publication prior to Mar. 28, 2005; 8 pages.

"OPENFILENAME Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

Examples of dialogs user interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.

Windows Forms: Exploiting Windows Longhorn "Features from Within Your Application" (CLI 391); downloaded from http://msdn.microsoft.com/longhorn/pdcmaterials/pdctalksavalon/>; date of first publication prior to Mar. 31, 2005; 27 pages.

MessageBox Function; downloaded from <http://msdn.microsoft.com>; date of first publication prior to Mar. 31, 2005; 4 pages.

Creating and Installing Theme Files; downloaded from <http://msdn.microsoft.com>; date of first publication prior to Feb. 21, 2005; 4 pages.

"MessageBox Function"; downloaded from <http://msdn.microsoft.com>; date of first publication prior to Mar. 31, 2005; 4 pages.

"Creating and Installing Theme Files"; downloaded from <http://msdn.microsoft.com>; date of first publication prior to Feb. 21, 2005; 4 pages.

"About Dialog Boxes"; downloaded from <http://msdn.microsoft.com>; date of first publication prior to Feb. 21, 2005; 10 pages.

"Property Sheets and Inspectors"; downloaded from <http://msdn.microsoft.com>; date of first publication prior to Feb. 21, 2005; 6 pages.

"PROPSHEETPAGE"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"DRAWITEMSTRUCT Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn.microsoft.com>; date of first publication prior to Feb. 25, 2005; 5 pages.

"Using Dialog Boxes"; downloaded from <http://msdn.microsoft.com>; date of first publication prior to Mar. 31, 2005; 8 pages.

"CreatePropertySheetPage Function"; downloaded from <http://msdn.microsoft.com>; date of first publication prior to Mar. 31, 2005; 1 page.

"DestroyPropertySheetPage Function"; downloaded from <http://msdn.microsoft.com>; date of first publication prior to Mar. 31, 2005; 1 page.

"PropertySheet Function"; downloaded from <http://msdn.microsoft.com>; date of first publication prior to Mar. 31, 2005; 2 pages.

"PropSheetPageProc Function"; downloaded from <http://msdn.microsoft.com>; date of first publication prior to Mar. 31, 2005; 2 pages.

"PropSheetProc Function"; downloaded from <http://msdn.microsoft.com>; date of first publication prior to Mar. 31, 2005; 2 pages.

"PSN_KILLACTIVE Notification"; downloaded from <http://msdn.microsoft.com>; date of first publication prior to Mar. 31, 2005; 1 page.

"PSN_QUERYCANCEL Notification"; downloaded from <http://msdn.microsoft.com>; date of first publication prior to Mar. 31, 2005; 1 page.

"PSN_RESET Notification"; downloaded from <http://msdn.microsoft.com>; date of first publication prior to Mar. 31, 2005; 1 page.

"PSN_SETACTIVE Notification"; downloaded from <http://msdn.microsoft.com>; date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSN_WIZBACK Notification"; downloaded from <http://msdn.microsoft.com>; date of first publication prior to Mar. 31, 2005; 3 pages.

"PSN_WIZFINISH Notification" ; downloaded from <http://msdn.microsoft.com>; date of first publication prior to Mar. 31, 2005; 1 page.

"PSN_WIZNEXT Notification"; downloaded from <http://msdn.microsoft.com>; date of first publication prior to Mar. 31, 2005; 3 pages.

"PSM_ADDPAGE Message"; downloaded from <http://msdn.microsoft.com>; date of first publication prior to Mar. 31, 2005; 2 pages.

"PSM_IDTOINDEX Message"; downloaded from <http://msdn.microsoft.com>; date of first publication prior to Mar. 31, 2005; 1 page.

"PSM_INDEXTOHWND Message"; downloaded from <http://msdn.microsoft.com>; date of first publication prior to Mar. 31, 2005; 1 page.

"PSM_INDEXTOID Message"; downloaded from <http://msdn.microsoft.com>; date of first publication prior to Mar. 31, 2005; 1 page.

"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.

"PSM_PRESSBUTTON Message"; downloaded from <http://msdn.microsoft.com>; date of first publication prior to Mar. 31, 2005; 1 page.

"PSM_QUERYSIBLINGS Message" ; downloaded from <http://msdn.microsoft.com>; date of first publication prior to Mar. 31, 2005; 1 page.

"PSM_SETCURSEL Message"; downloaded from <http://msdn.microsoft.com>; date of first publication prior to Mar. 31, 2005; 1 page.

"PSM_SETCURSELID Message"; downloaded from <http://msdn.microsoft.com>; date of first publication prior to Mar. 31, 2005; 1 page.

"PSM_SETFINISHTEXT Message"; downloaded from <http://msdn.microsoft.com>; date of first publication prior to Mar. 31, 2005; 1 page.

"PSM_SETHEADERTITLE Message"; downloaded from <http://msdn.microsoft.com>; date of first publication prior to Mar. 31, 2005; 1 page.

"PSM_SETWIZBUTTONS Message"; downloaded from <http://msdn.microsoft.com>; date of first publication prior to Mar. 31, 2005; 2 pages.

"PROPSHEETHEADER Structure"; downloaded from <http://msdn.microsoft.com>; date of first publication prior to Mar. 31, 2005; 5 pages.

"PROPSHEETPAGE Structure"; downloaded from <http://msdn.microsoft.com>; date of first publication prior to Mar. 31, 2005; 4 pages.

"PSHNOTIFY Structure"; downloaded from <http://msdn.microsoft.com>; date of first publication prior to Mar. 31, 2005; 1 page.

"BCM_GETIDEALSIZE Message"; downloaded from <http://msdn.microsoft.com>; date of first publication prior to Mar. 31, 2005; 1 page.

"PSM_SETTITLE Message"; downloaded from <http://msdn.microsoft.com>; date of first publication prior to Mar. 31, 2005; 1 page.

A.T. McCray, et al., Extending the Role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences,* IEEE Computer Society, Big Island, Hawaii, Jan. 7-10, 2002, p. 1862-1867.

"About Managing Messages With Rules", Microsoft® Outlook® 2003 Help file, 3 pages.

"Trillian/Trillian Pro IM Clients" Products Description, © 1999-2004 Cerulean Studios, <http://www.ceruleanstudios.com> [retrieved Apr. 30, 2004].

International Search Report of WO2004/097638 A1 (McKee, et al.) dated Nov. 11, 2004.

Cohen, et al., "A Case for Associative Peer to Peer Overlays"—ACM SIGCOMM Computer Communications Review, vol. 33, No. 1, Jan. 2003, pp. 95-100.

Lui, et al., "Interoperability of Peer-to-Peer File Sharing Protocols"—ACM SIGecom Exchanges, vol. 3, No. 3, Aug. 2002, pp. 25-33.

Yong Kyu Lee, et al., Metadata Management of the SANtopia File System, Proceedings of the 8th International Conference on Parallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australasian User Interface Conference (AUIC'01), Gold Coast, Queensland, Australia, Jan. 29 - Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001, pp. 243-252, IEEE Computer Society, 2001, ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Definition Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description - An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

* cited by examiner

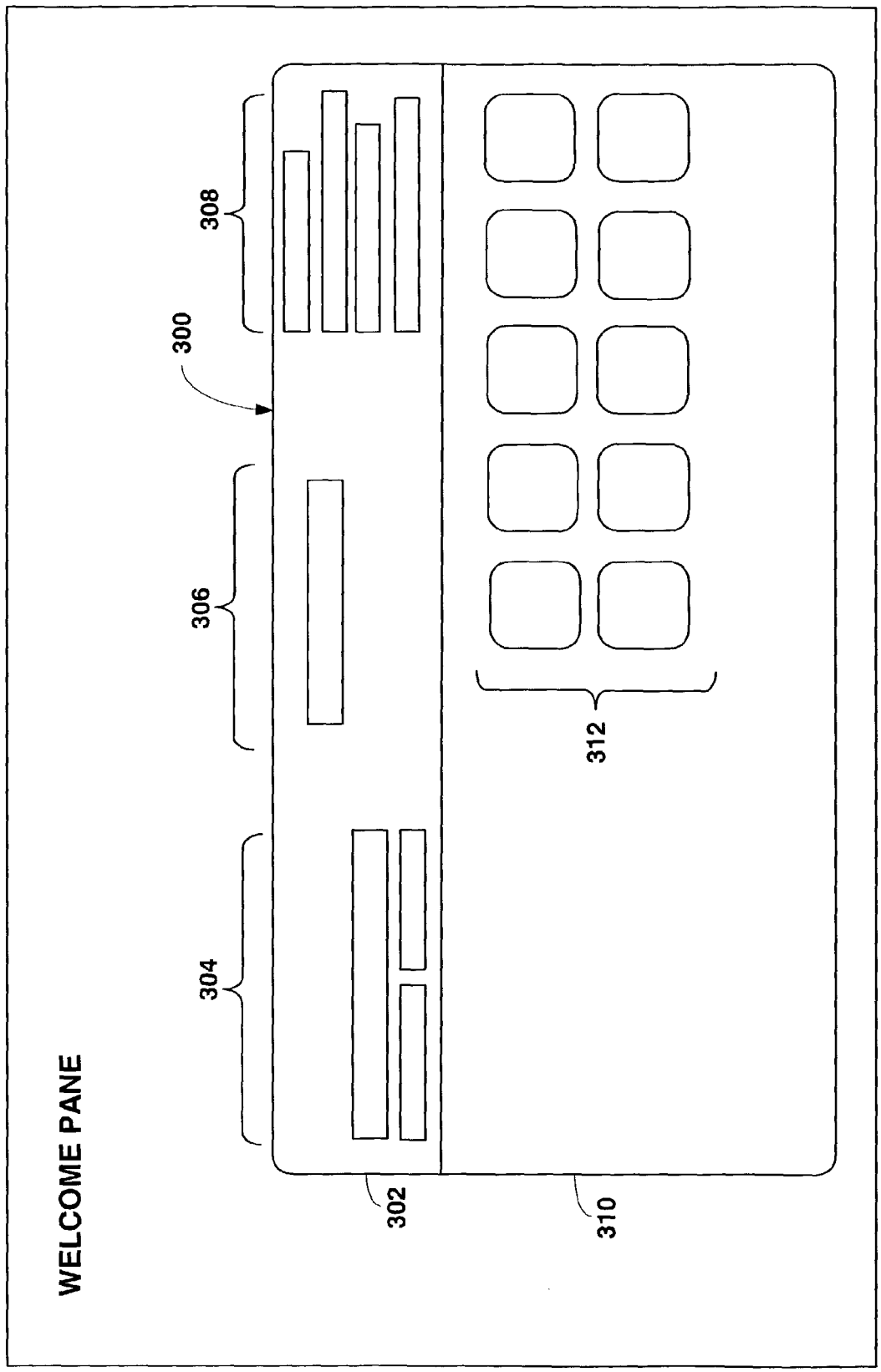

SYSTEM AND METHOD FOR USER MODIFICATION OF METADATA IN A SHELL BROWSER

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates generally to the field of computer software. More particularly, the invention relates to a system and method for providing an improved user experience within a shell or file system browser so that users can more readily identify an item based on the metadata associated with that item.

BACKGROUND OF THE INVENTION

The need to readily identify items stored in a computing environment such as a personal computer (PC) is dramatically increasing as more individuals utilize computers in their daily routines and as the type of stored information varies between pictures, music, documents, etc. Documents and media are typically stored on computers in a hierarchical fashion and are organized with files of information or media stored within folders. File system browsers enable users to navigate through the file system and locate and open files and folders. For example, Microsoft Corporation's WINDOWS® EXPLORER™ is an operating system utility which enables users to browse the file system.

Many users find it difficult to correctly identify a file based on the information currently available in conventional file system browsers. Of course the contents of a file can be verified by opening it with an application program, but this method of browsing files is extremely inefficient. The ability to view metadata about a file within a file system browser can greatly assist a user in identifying a particular file without having to open it. In Microsoft Corporation's WINDOWS® 9X operating systems, for example, a user can view object metadata by accessing the property sheet for a particular object. A property sheet presents the user with a list of the attributes or settings of an object in the form of a tabbed, index-card-like selection of property pages, each of which features standard dialog-style controls for customizing parameters. However, using the property sheet to locate an item can be slow and cumbersome, and some users find it difficult to locate the relevant metadata in a property sheet. Similarly, the use of infotips to locate an item can be slow and cumbersome because a user must hover the mouse over each file in order to view the limited metadata displayed in an infotip.

Conventional file system browsers do not allow users to enter and edit metadata relating to files and folders, which would significantly enhance a user's ability to later locate a file. To date, the ability of users to enter and edit metadata has been limited to special purpose software programs. For example, media players for electronic music files present users with the ability to edit metadata associated with music albums and artists. Another example of such programs includes application programs for electronic picture files. However, the utility of media players and other such programs is limited to the particular type of file supported by the program, as opposed to a general purpose file system browser which supports multiple file types.

Microsoft Corporation's WINDOWS® XP operating system includes an image browser for use in the My Pictures folder. The My Pictures folder is endowed with special features which enable users to view pictures as photos, not just as document icons. My Picture's image browsing features include the ability to view thumbnail-size and large versions of photos, rotate photos that are sideways, and create a slide show. A user can also view a photo's details, such as its dimensions, the date and time it was taken, and the name of the camera that took it. The preview control area in the My Picture's folder contains an enlarged preview image of a user-selected image, iterator buttons to assist a user in iterating through a series of pictures and controls for rotating pictures in a clockwise or counterclockwise direction. While the image browsing features in WINDOWS® XP have advanced the state of the art by alleviating the need to invoke an application program to view and manipulate pictures, users still cannot enter and edit metadata associated with the pictures.

Accordingly, there is a need for an improved user experience within a shell or file system browser which enables users to readily locate an item based on the metadata associated with that item. There is also a need for a system and method which allow users to enter and edit metadata associated with items of various types within a shell browser without the need to invoke an application program.

SUMMARY OF THE INVENTION

The present invention meets the above needs and overcomes one or more deficiencies in the prior art by providing a system and method for user modification of metadata in a shell browser. In one aspect of the present invention, a shell browser is provided which includes a window and an edit control. The window displays a group of items and also displays metadata values associated with one or more of the displayed items. The edit control permits user modification of at least a portion of the metadata values displayed in the window.

Another aspect of the present invention is a graphical user interface embodied on a computer-readable medium and executable on a computer. The graphical user interface includes a first screen area which displays a set of items in a shell browser and a second screen area which displays metadata associated with one or more of the displayed items. The graphical user interface also presents the user with means within the shell browser for modifying the displayed metadata.

In a further aspect of the present invention, computer-implemented methods are provided for enabling a user to modify metadata within a shell browser. One such method includes displaying a plurality of items, receiving a first input from the user representing a selection of at least one displayed item, displaying metadata associated with the selected item (s) and providing an edit control for user modification of the displayed metadata. Another such method includes displaying a welcome pane and metadata associated with the welcome pane and providing an edit control for user modification of the displayed metadata.

Still another aspect of the present invention is a data structure containing metadata associated with one or more items displayed in a shell browser. The data structure, which is stored on one or more computer-readable media, includes a field containing user modifiable metadata associated with the one or more displayed items, and the user modifiable metadata contained in the data structure is also displayed in the shell browser.

BRIEF DESCRIPTION OF THE DRAWING

The present invention is described in detail below with reference to the attached drawing figures, wherein:

FIG. 3 is a schematic diagram of a welcome pane in a shell browser;

DETAILED DESCRIPTION OF THE INVENTION

The present invention relates to a system and method for providing an improved user experience within a shell browser so that users can more readily identify an item based on the metadata associated with that item. An exemplary operating environment for the present invention is described below.

Figure 1:
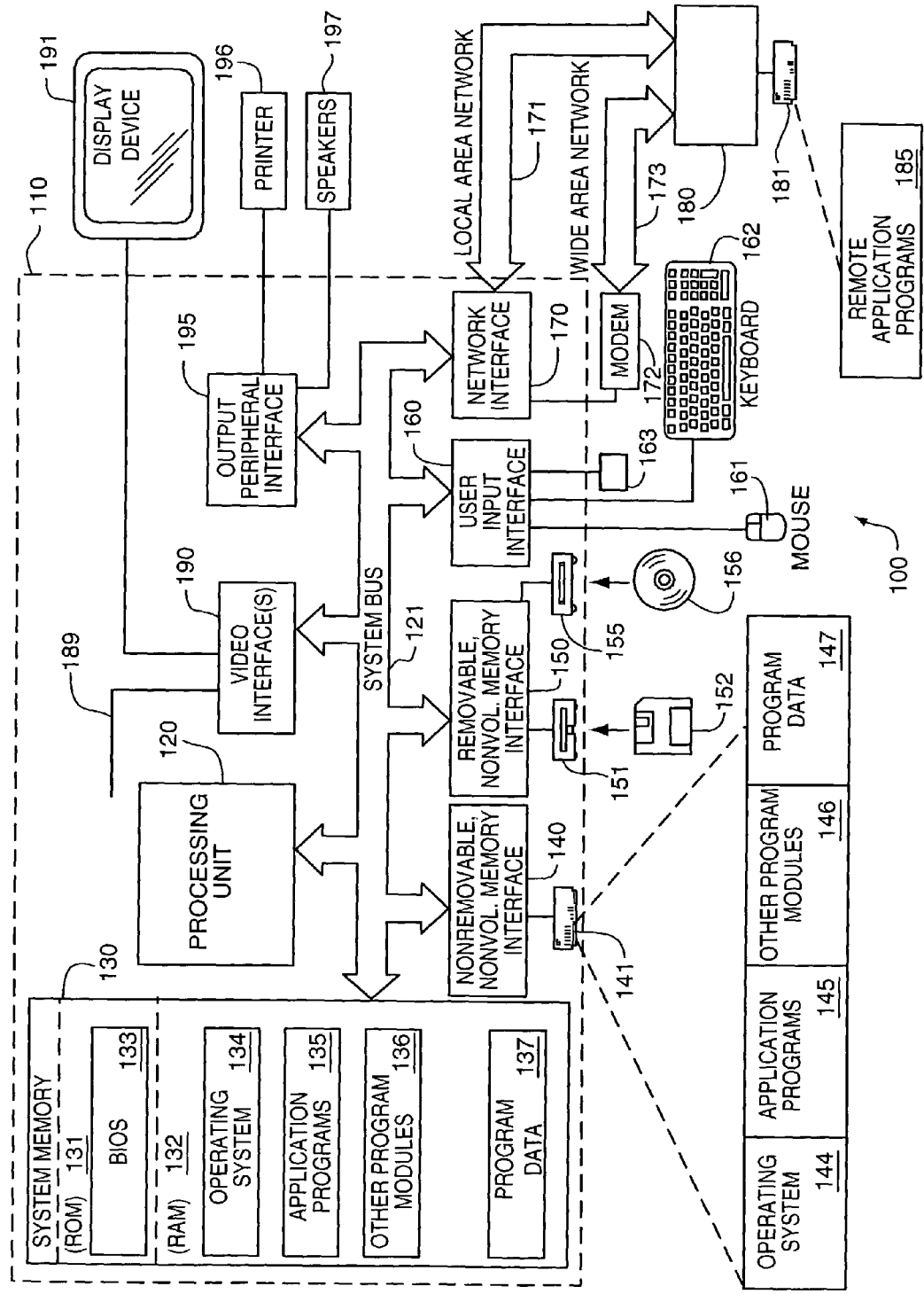
FIG. 1 is a block diagram of a computing-system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2A:
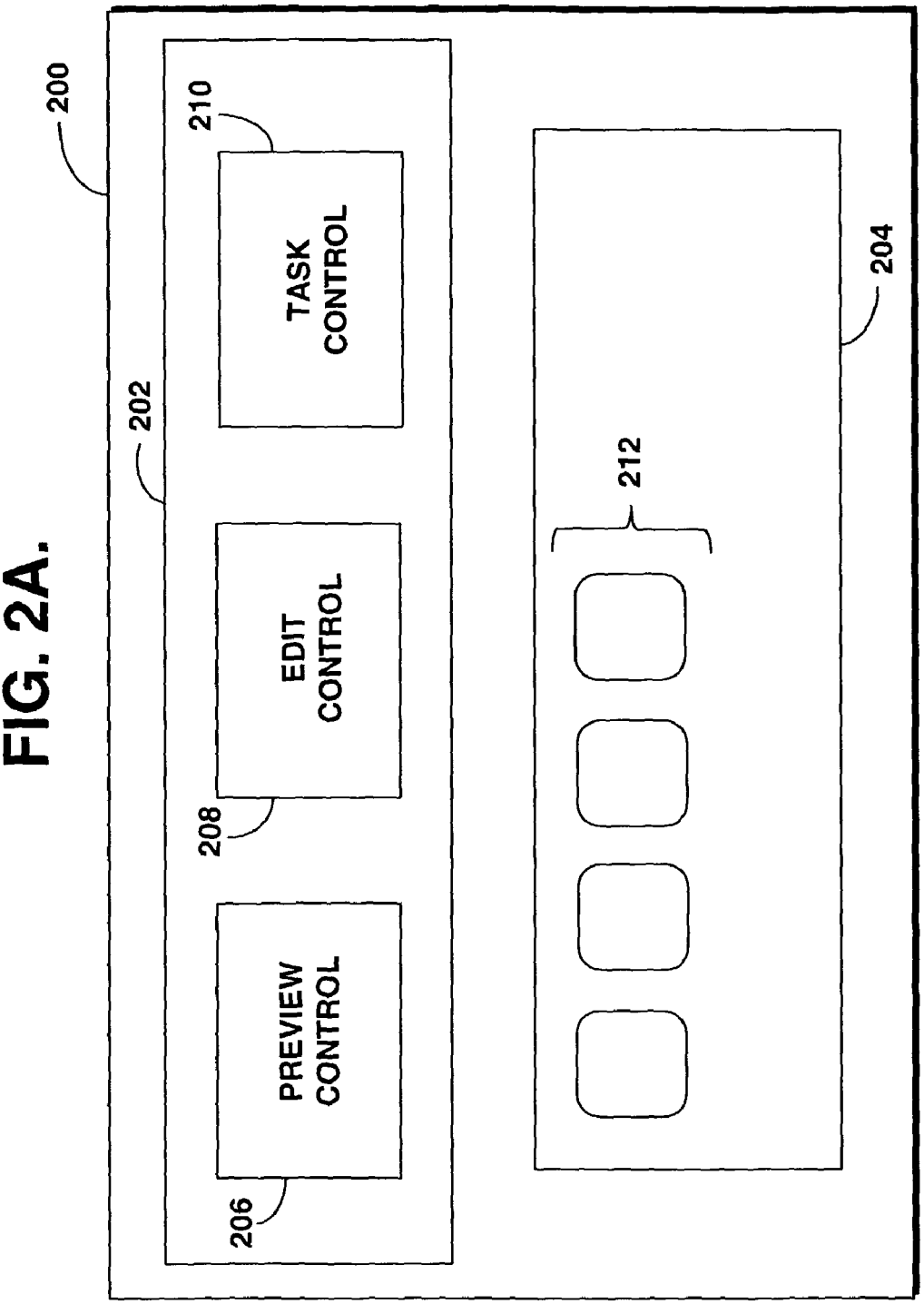
FIG. 2A is a block diagram of an exemplary graphical user interface for a shell browser having an edit control in accordance with an embodiment of the present invention.

Turning to FIG. 2A, a window 200 represents a screen-size display area for a graphical user interface of a shell browser. The window 200 contains a preview pane area 202 and a view area 204. The preview pane 202 may include a preview control 206, a user interface (UI) or edit control 208, and a task control 210. Typically, the preview control 206 will provide the user with an image or other visual display of the item being previewed (e.g., a selected file). The preview control 206 may also present the user with controls such as iterator buttons which allow the user to shift the focus from one item to the next by clicking a mouse button. Metadata corresponding to one or more items and/or metadata corresponding to the item container may be displayed in a variety of locations within the window 200. For example, the edit control and metadata may be co-located within edit control area 208 so that the edit control area not only includes a display of key properties of the previewed item but also presents the user with the option of making edits to the metadata. The task control 210 contains tasks relevant to the namespace and/or the selection.

For purposes of the present invention, the terms "metadata" and "user modifiable metadata" exclude the shell item name. The term "shell item name" refers to the property which is used for purposes of sorting and displaying the item within the shell browser. As mentioned above, one unique aspect of the present invention is the ability of a user to edit metadata within a shell browser.

Those skilled in the art will appreciate that the present invention contemplates the presence of optional features within the window 200. For example, the preview control 206 and the task control 210 are not essential features for purposes of the present invention. Moreover, other non-essential features which are not shown in FIG. 2A, such as a toolbar which includes iterator buttons or a show/hide button so the user can open/close the preview pane, are also within the scope of the present invention. Nevertheless, these and other optional features may assist the user in readily locating a particular item in the shell browser.

The view area 204 provides a listview of one or more items 212, such as file system files or folders. The term "listview" refers to an enumeration or list of items within a container. The terms "item" and "shell item" are used interchangeably herein to refer to files, folders and other such containers, and other non-file objects which can be represented in a listview. Examples of non-file objects may include, but would not be limited to, contacts, favorites and email messages. The terms "shell browser" and "file system browser" are used interchangeably herein to refer to a browser which allows a user to navigate through various namespaces including files and other non-file items.

Those skilled in the art will appreciate that the present invention contemplates many possible designs and layouts for the window 200. For example, the preview pane 202 is shown above the view area 204 in FIG. 2A. However, other layouts, such as placing the preview pane 202 and the view area 204 side-by-side, are clearly within the scope of the present invention. The location of the edit control 208 is also independent of the location of the displayed metadata and independent of the location of any other controls. There are also many possible view types for the items depicted in list-view area 204, such as details, slide show, filmstrip, thumbnail, tiles, icons, etc.

Figure 2B:
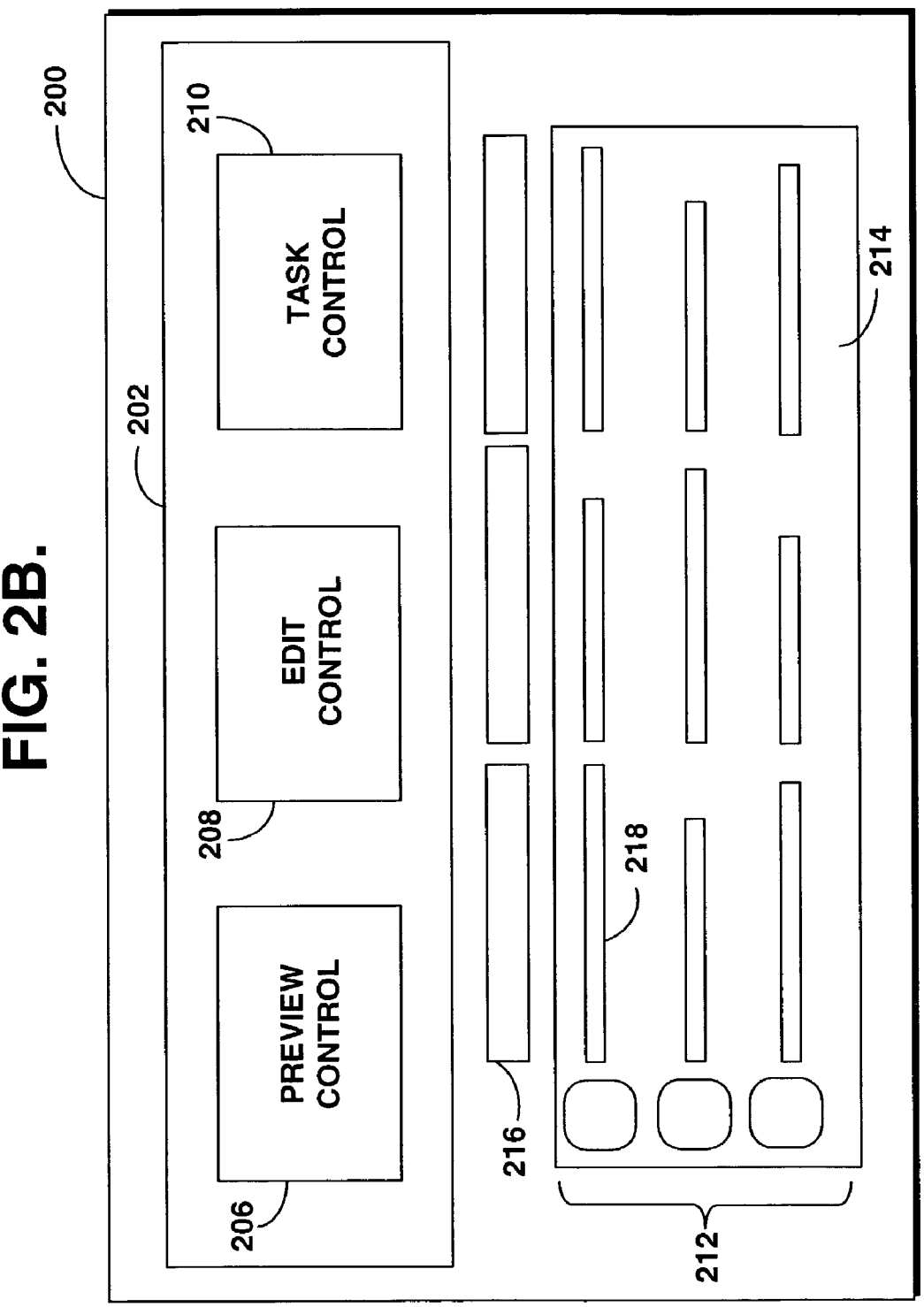
FIG. 2B is a block diagram of an exemplary graphical user interface for a shell browser having one or more edit controls in accordance with an embodiment of the present invention.

FIG. 2B is similar to FIG. 2A, except that the view area 204 is replaced by a view area 214 which displays the items 212 in details mode. As is typical for shell items displayed in details mode, the items 212 are aligned in a column at the left-hand side of view area 214, and one or more column headings 216 form the top row of a set of columns containing metadata 218 relating to the corresponding item located in the same row. Importantly, the present invention contemplates the ability of a user to explicitly change a metadata value to another value through instantiation of one or more edit controls 208 anywhere within the window 200. For example, an edit control may be provided within the preview pane 202 and/or within the view area 214. For example, an edit control which is not initially visible to a user may be provided within the view area 214. Such a control can be instantiated, for example, when the user hovers over the metadata 218 and then clicks on it to enter an editing mode.

Referring next to FIG. 3, a schematic illustration is provided of a welcome pane 300 in a shell browser. A welcome pane is sometimes referred to as a "null select" pane because it represents a namespace or container as opposed to a selection. If the user has not yet made a selection, a preview pane 302 displays metadata 304 and key tasks relating to the folder or shell library. If desired, the tasks may be separated into premiered tasks 306 and other relevant tasks 308. The welcome pane 300 also includes a view area 310, in which multiple files or other items 312 may be viewed. The welcome pane metadata 304 may include information such as properties of the container (e.g., MyPictures), in which case the metadata display may be static. Alternatively, the welcome pane metadata 304 may include information such as a sampling of metadata from each of the items within the container, in which case the metadata display may change frequently. For example, the metadata display may be limited to properties of one item at a time by cycling from one item to the next every 30 seconds.

Figure 4:
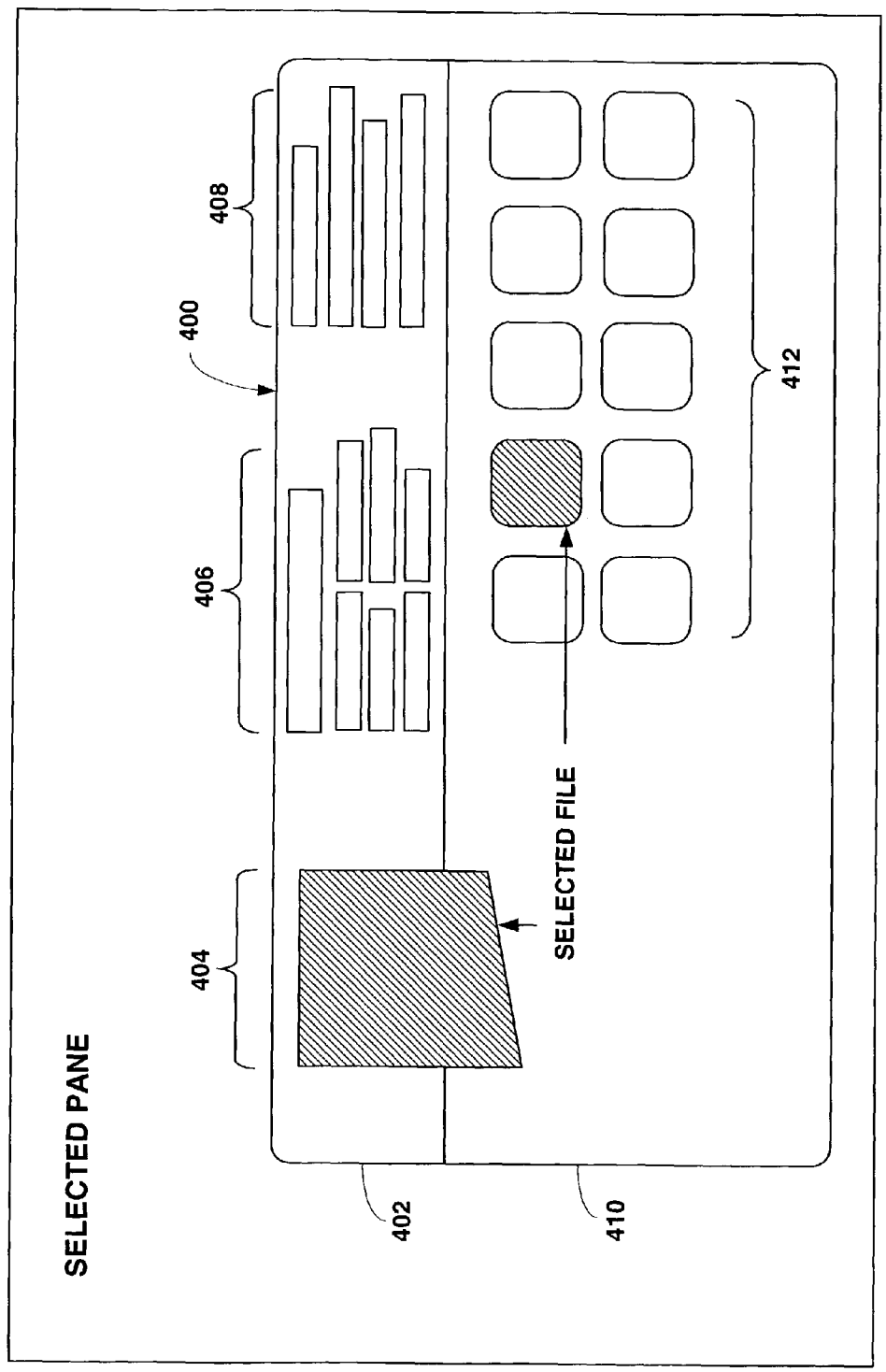
FIG. 4 is a schematic diagram of a selected pane in a shell browser.

FIG. 4 is a schematic illustration of a selected pane 400 in a shell browser. As opposed to a welcome pane, a selected pane represents a selection by the user. If the user selects a container or folder, the selected pane need not be identical to the welcome pane for that container or folder. In FIG. 4, the selected pane 400 includes a preview pane 402 which contains a preview control 404, a metadata display 406 and a tasks display 408. Like the welcome pane 300 (in FIG. 3), the selected pane 400 also includes a view area 410, in which multiple files or other items 412 may be viewed. In FIG. 4, however, the user has selected one of the files. Consequently, the preview control 404 displays a preview image of the selected file, the metadata display 406 shows properties of the selected file, and the tasks display 408 provides a menu of relevant tasks for operating on the selected file.

Figure 5:
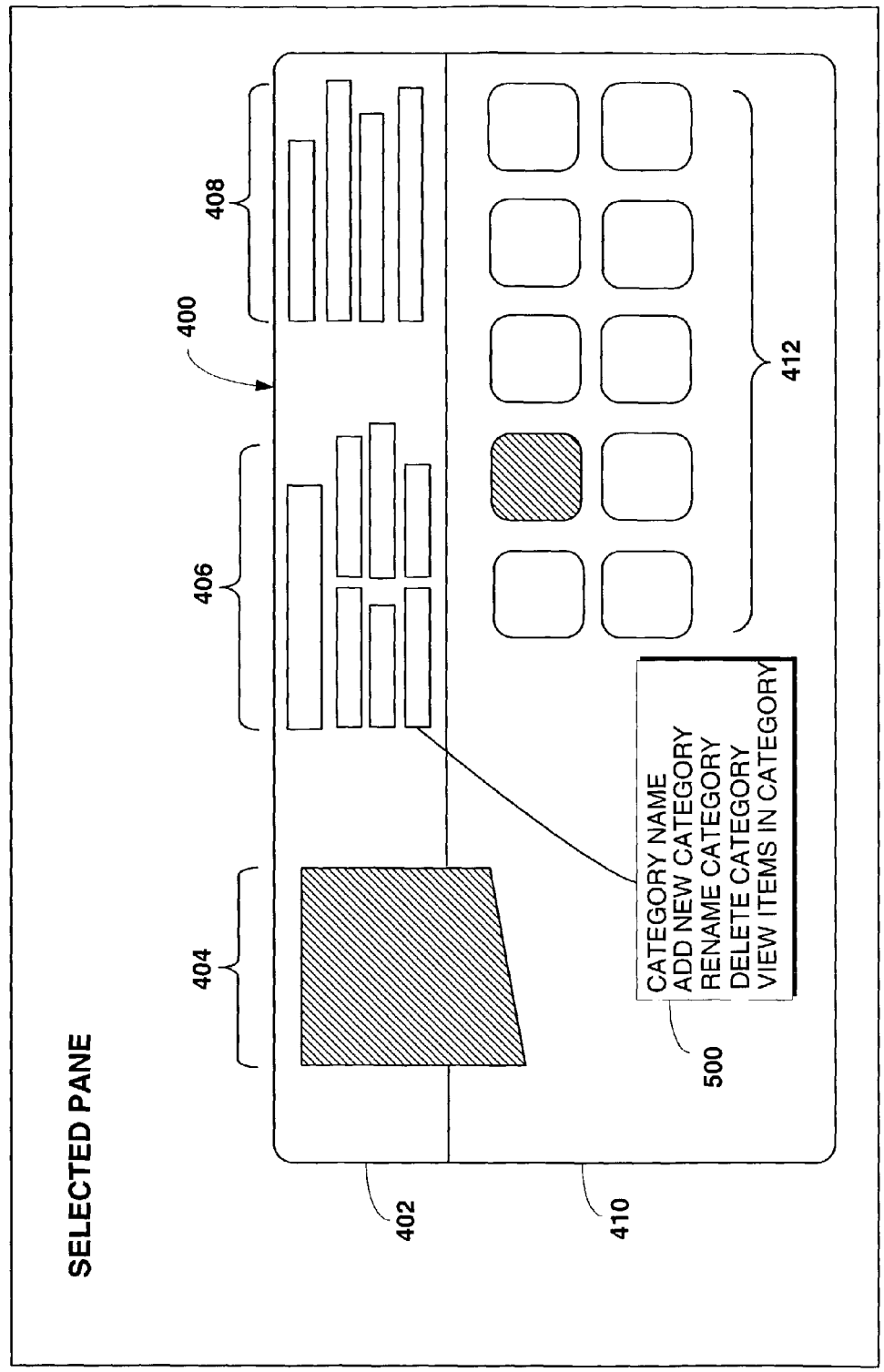
FIG. 5 is a schematic diagram of the selected pane of FIG. 4 including a context menu enabling a user to modify metadata in a shell browser in accordance with an embodiment of the present invention.

FIG. 5 is a schematic representation of the selected pane of FIG. 4 but which also includes a context menu 500 to enable a user to modify metadata in a shell browser in accordance with an embodiment of the present invention. The context menu 500 in FIG. 5 presents the user with several options for changing the selected metadata. The generic text shown in the menu 500 is of course merely one example of the type of options which may be presented to a user for editing the displayed metadata. A context menu can be provided in any window, including a welcome pane, to improve the user experience. As those skilled in the art will appreciate, any number and variety of context menus could be supported by the present invention. For purposes of the present invention, one means for enabling user modifications to displayed metadata within a shell browser is to provide a context menu such as editable metadata context menu 500. A user may summon the context menu, for example, by clicking on the corresponding text or object in the preview pane.

Those skilled in the art will appreciate that the present invention contemplates means other than context menus for enabling user modifications to displayed metadata within a shell browser. Another such means for is for the user to click on the metadata to enter an editing mode. By contrast, a user could enter an editing mode by hovering over the relevant text or object in the preview pane. Numerous alternative means are available and within the scope of the present invention.

Figure 6:
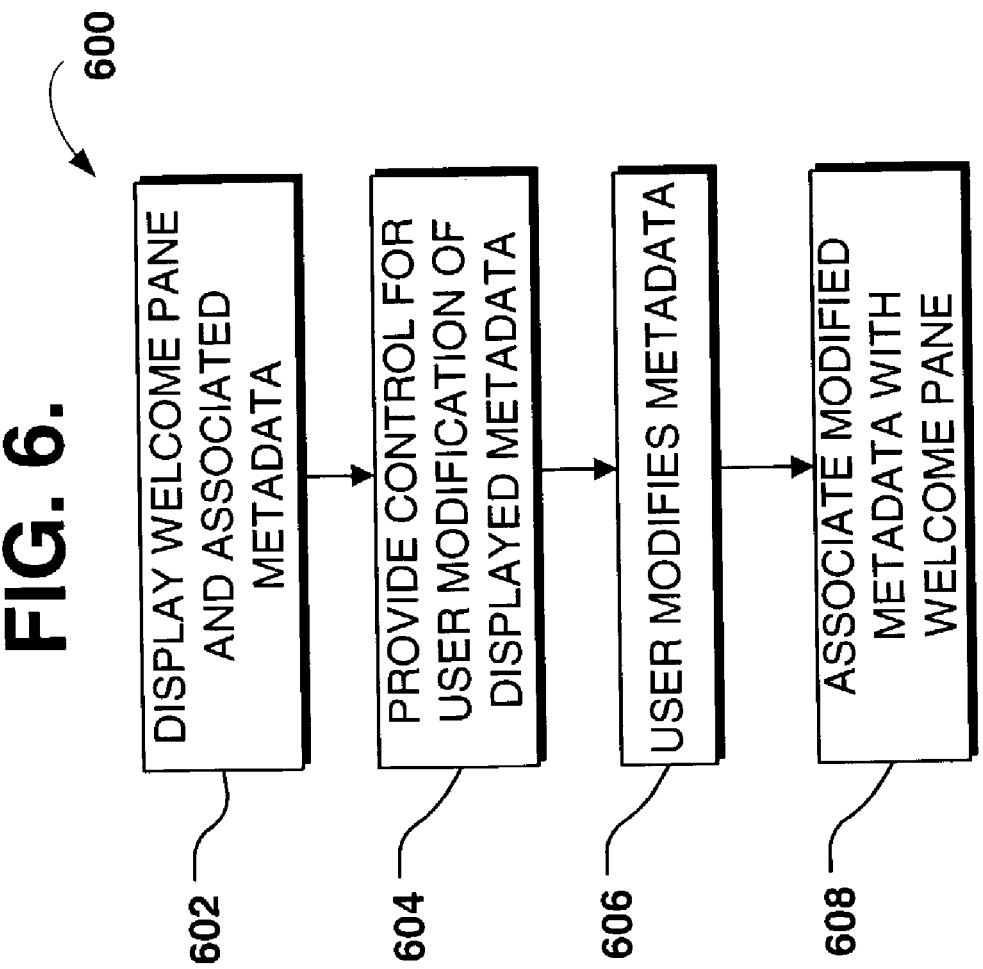
FIG. 6 is a flow diagram illustrating a method for enabling a user to modify metadata displayed in a welcome pane within a shell browser in accordance with an embodiment of the present invention.

FIG. 6 is a flow diagram illustrating a method 600 for enabling a user to modify metadata displayed in a welcome pane within a shell browser in accordance with an embodiment of the present invention. The method 600 includes displaying a welcome pane and metadata associated with the welcome pane at 602. Then, at 604, the method provides a control for user modification of the displayed metadata. When the user manipulates the control to modify the displayed metadata at 606, the method then associates the modified metadata with the welcome pane at 608 so that the modified metadata will be displayed the next time the welcome pane is displayed.

Figure 7:
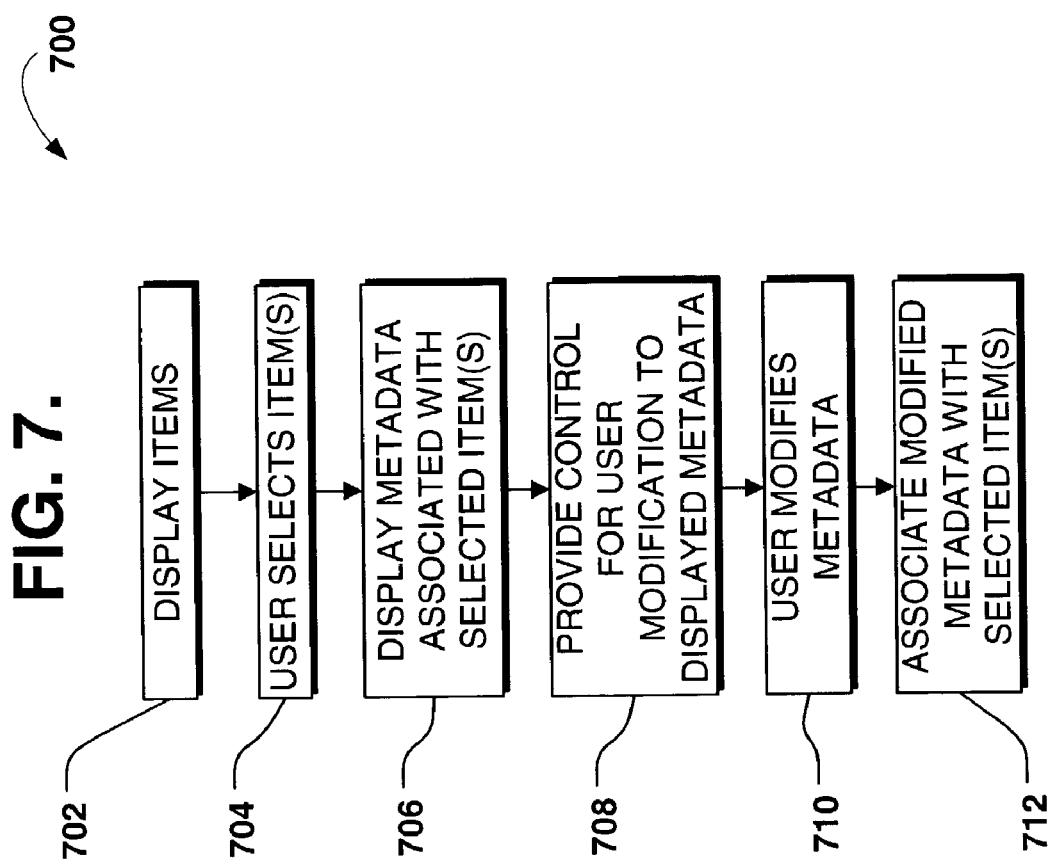
FIG. 7 is a flow diagram illustrating a method for enabling a user to modify metadata displayed in a selected pane within a shell browser in accordance with an embodiment of the present invention.

FIG. 7 is a flow diagram illustrating a method 700 for enabling a user to modify metadata displayed in a selected pane within a shell browser in accordance with an embodiment of the present invention. At 702, the method 700 first displays a number of items, such as items in a welcome pane or items in a selected container. When the user selects one or more of the items at 704, the method displays metadata associated with the selected item(s) at 706. At 708, the method provides a control for user modification of the displayed metadata. When the user manipulates the control to modify the displayed metadata at 710, the method then associates the modified metadata with the selected item(s) at 712 so that the modified metadata will be displayed the next time the selected item(s) is/are displayed.

In the event a user selects multiple items at 704, the displayed metadata may include intersecting properties of the selected items, a union of properties, or perhaps a new property relevant to the selected items. Alternatively, the displayed metadata may include a rotating sample of metadata from each of the selected items (e.g., cycling from one selected item's metadata to the next selected item's metadata every 30 seconds). It is possible for the display of metadata which would result from a selection of all of the items to be identical to the display of metadata which would result from a null select.

Figure 8:
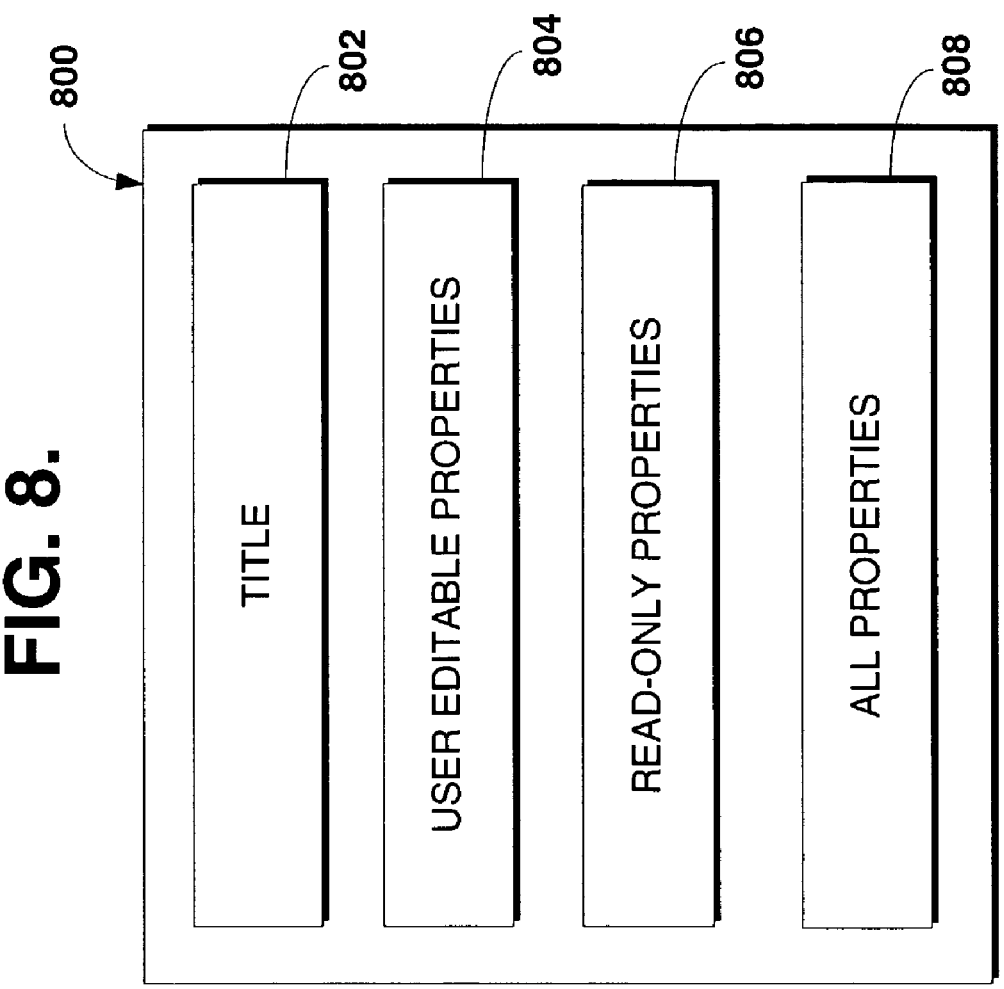
FIG. 8 is a block diagram of a data structure containing user modifiable metadata associated with an item displayed in a shell browser.

FIG. 8 is a block diagram of a data structure 800 containing user modifiable metadata associated with an item displayed in a shell browser. The data structure 800 includes a title field 802 which indicates the name of the item. In the case of non-file items, the title field 802 may contain the name of whatever property is used to alphabetize that item in a list-view. The data structure 800 includes a user editable properties field 804 containing one or more properties associated with the displayed item, wherein the user editable properties are displayed in the shell browser with the displayed item. The data structure 800 may optionally include a read-only properties field 806 which contains any read-only properties associated with the displayed item and worthy of display in the shell browser. Given the size constraints of the metadata display in the shell browser, the number of properties in fields 804 and 806 may be limited. Consequently, the data structure 800 may optionally include an all properties field 808, which contains a link or pointer to a location (e.g., a property page) which contains all of the properties or metadata associated with the displayed item. Of course, the all properties field 808 would not be necessary in the event that fields 804 and 806 contain all of the properties associated with the displayed item. The data structure 800 is stored on one or more computer-readable media, such as in a file system or shell, to provide rich storage views, and thus an improved user experience, within the shell browser.

The present invention enables a number of scenarios which were not possible with conventional shell browsers. As a first example, a student can manage her projects using the preview pane. When she obtains new documents as part of a project she is working on, she can select those documents in her document library and enter the name of the document author and the name of the project into keyword fields using the edit control. Now the new documents will show up in her favorite view: "Documents Grouped by Keyword and Listed by Author." A second example of a new scenario enabled by the present invention involves an employee looking for materials for an upcoming ad campaign. As he browses through his employer's stock collection of photos using the shell browser, he selects a couple of pictures and, from the preview pane, adds a new keyword "Summer 2003 Campaign." Having updated the metadata for a multiple selection, the employee then pivots by keyword and can view all of the "Summer 2003 Campaign" files grouped together. Many other scenarios which take advantage of the present invention would be apparent to those skilled in the art.

Alternative embodiments and implementations of the present invention will become apparent to those skilled in the art to which it pertains upon review of the specification, including the drawing figures. Accordingly, the scope of the present invention is defined by the appended claims rather than the foregoing description.

What is claimed is:

1. A computer display having an operating system shell browser rendered thereon, said shell browser comprising:
   an operating system shell browser display window divided into at least two panes; wherein
      a first pane displays a group of graphical items representing a plurality of files and folders in a computing system; and
      a second pane displays application-neutral metadata values associated with a plurality of user-selected ones of the displayed items; and
   an operating system interface element that permits, without invoking an application running in the operating system, user modification of at least a plurality of the metadata values displayed in the second pane, wherein user modifications are application-neutral such that a modified metadata value is available to subsequent requesting applications, and wherein user modifications are in response to a user selecting said displayed metadata values to directly modify the metadata values in the second pane.

2. The computer display of claim 1, wherein the group of items includes one or more files.

3. The computer display of claim 1, wherein the group of items includes one or more non-file objects.

4. The computer display of claim 1, wherein the group of items includes one or more folders.

5. The computer display of claim 1, wherein the group of items includes a folder and the contents of the folder.

6. The computer display of claim 1, wherein the shell browser supports a plurality of item types.

7. The computer display of claim 6, wherein the plurality of item types includes music files.

8. The computer display of claim 1, wherein the metadata values are displayed together with a preview of a selected one of the group of items.

9. The computer display of claim 8, wherein the group of items are displayed as a list.

10. The computer display of claim 1, wherein the group of items are displayed in response to an input from the user.

11. The computer display of claim 1, wherein the displayed metadata values include an intersection or union of metadata values that are associated with multiple displayed items that the user has selected.

12. The computer display of claim 11, wherein the displayed metadata values include an intersection of metadata values that are associated with the selected items.

13. The computer display of claim 1, wherein, when the user has not selected any of the displayed items, the displayed metadata values include an intersection or union of metadata values that are associated with the group of items.

14. The computer display of claim 1, wherein user modification of metadata values includes deleting metadata values.

15. The computer display of claim 1, wherein all of the displayed metadata values are user modifiable.

16. The computer display of claim 1, wherein a first portion of the displayed metadata values are read-only and a second portion of the displayed metadata values are user modifiable.

17. The computer display of claim 1, wherein the first and second areas share a common border.

* * * * *